United States Patent
Wright

(10) Patent No.: US 6,171,009 B1
(45) Date of Patent: Jan. 9, 2001

(54) METHOD AND APPARATUS FOR TEMPERATURE-STABILIZING A JOINT

(75) Inventor: Richard Joseph Wright, Jefferson Parish, LA (US)

(73) Assignee: Lockheed Martin Corporation, New Orleans, LA (US)

(*) Notice: Under 35 U.S.C. 154(b), the term of this patent shall be extended for 0 days.

(21) Appl. No.: 09/175,707

(22) Filed: Oct. 20, 1998

(51) Int. Cl.[7] .................................................. F16B 5/00
(52) U.S. Cl. ........................ 403/30; 403/404; 403/408.1
(58) Field of Search ................................ 403/28, 29, 30, 403/337, 404, 408.1, 373

(56) References Cited

U.S. PATENT DOCUMENTS

| | | | |
|---|---|---|---|
| 3,826,088 | * 7/1974 | Nash et al. | 60/261 |
| 4,270,871 | * 6/1981 | Grise | 403/29 |
| 4,299,018 | 11/1981 | Bickerstaff et al. | 29/129 |
| 4,312,599 | 1/1982 | Darolia | 403/29 |
| 4,376,606 | 3/1983 | Peterson | 411/155 |
| 4,490,083 | 12/1984 | Rebish | 411/338 |
| 4,540,304 | 9/1985 | Pavelka et al. | 403/12 |
| 4,834,569 | 5/1989 | Foote et al. | 403/2 |
| 5,022,805 | * 6/1991 | Roberts | 60/261 X |
| 5,047,896 | 9/1991 | Zust | 361/412 |
| 5,090,198 | * 2/1992 | Nightingale et al. | 60/261 |
| 5,427,334 | 6/1995 | Rauscher, Jr. | 244/135 R |
| 5,451,116 | * 9/1995 | Czachor et al. | 403/28 X |
| 5,467,592 | * 11/1995 | Carletti | 60/261 |
| 5,497,616 | 3/1996 | Roberts | 60/261 |
| 5,592,814 | 1/1997 | Palusis et al. | 60/271 |
| 5,722,709 | * 3/1998 | Lortz et al. | 403/28 X |

FOREIGN PATENT DOCUMENTS

| | | | |
|---|---|---|---|
| 2087503 | * 5/1982 | (GB) | 403/30 |
| 1774081 | * 11/1992 | (SU) | 403/30 |

* cited by examiner

Primary Examiner—Harry C. Kim
(74) Attorney, Agent, or Firm—W. H. Meise; T. G. Fierke

(57) ABSTRACT

A joint between materials having disparate coefficients of thermal expansion (CTE) is compensated by a collar which extends a dimension of that one of the different materials which has the lesser CTE. A set of different collars provides compensation for sheets of material of different thicknesses when used with fasteners of a given material. The joint is assembled by selecting the sheets of various thicknesses to be juxtaposed, applying the fastener with a compensation collar corresponding to each one of the different sheets, and tightening the joint.

4 Claims, 4 Drawing Sheets

METHOD AND APPARATUS FOR TEMPERATURE-STABILIZING A JOINT

FIELD OF THE INVENTION

This invention relates to temperature compensation of a joint made from materials having dissimilar temperature coefficients of expansion.

BACKGROUND OF THE INVENTION

Increased sophistication of spacecraft and aircraft has resulted in improved weight-to-payload ratios. A part of this improvement is attributable to the use of lightweight composite materials for many structural portions of the vehicle. The use of composites for pressure vessels is well known. For example, U.S. Pat. No. 5,427,334, issued Jun. 27, 1995 in the name of Rauscher, Jr. describes a method for manufacturing a composite propellant vessel with a built-in vane.

One of the problems with the use of such composites on spacecraft or aircraft is that of the relatively great coefficient of thermal or temperature expansion (CTE) of composites, relative to other materials, such as steel. This problem is particularly acute, even in terrestrial applications, when the composite materials are used in or about cryogenic materials such as liquid hydrogen. The structure including the composite materials must initially be fabricated at temperatures at which humans can work, and may then be subject to extreme temperatures, such as $-423°$ F. ($-253°$ C.), when filled with cryogen. Extremely high temperatures may also be encountered under other conditions. The CTE of composite materials such as carbon-fiber reinforced polymer is large relative to other materials through the thickness, or in the direction a fastener would travel, such as steel, and its resistance to crushing forces is much lower.

When a steel screw or bolt is used with a nut to fasten together two structures, such as a hatch on a port of a pressure vessel, where both are made from composite material, the assembly is performed at room temperature, and if the nut is tightened to provide a force which is just below the force which would crush the composite material, the joint will loosen at cryogenic temperatures because the composite contracts more than the bolt. If the joint is exposed to a temperature significantly higher than room temperature, the joint will be crushed, because the composite material expands more than the bolt. Belleville washers are sometimes used to maintain tension in such structures, but tensioning the washer increases the tension in the bolt beyond that required for simply tightening the joint, thereby requiring a larger-diameter, and hence heavier, bolt. Also, Belleville washers must undesirably be carefully designed to the application.

Improved joints between composites are desired.

SUMMARY OF THE INVENTION

A joint subject to temperature variation includes a sheet of material defining a through aperture for an elongated fastener. The material of the sheet has a particular temperature coefficient of expansion, and is subject to damage under compressive forces greater than a given level. An elongated fastener includes a body portion, part of which extends through the aperture. The fastener also includes a head at one end and an other threaded end, and has a temperature coefficient of expansion less than the particular temperature coefficient of expansion of the material. The fastener further includes a nut threaded onto the threaded end. When the nut is tightened at an assembly temperature within the range of variation, it compresses that portion of the sheet of material lying in the region between the head and the nut to a value of compressive force less than the given level. Under these conditions, temperatures different from the assembly temperature may cause the material of the sheet to expand or contract at a rate greater than the corresponding expansion or contraction rate of the fastener so as to result in compression exceeding the given level. A collar surrounds a portion of the body of the fastener, and is located either (one of) between (a) the nut and the sheet of material, or (and) (b) the head and the material. The collar has a temperature coefficient of expansion which is less than that of the fastener, and has a length, which is in the direction of the axis of elongation of the body of the fastener, selected so that the difference between a first product and a second product is greater than or equal to the product of the particular coefficient of expansion of the material multiplied by the thickness of the material. In this selection, the first product is the product of the coefficient of expansion of the fastener multiplied by the length of that portion of the body of the fastener lying between facing sides of the head and the nut. In this selection, the second product is the product of the coefficient of expansion of the collar, multiplied by the length of the collar.

In a particular avatar of the invention, the material of the sheet is carbon fiber reinforced laminate having a temperature coefficient of expansion of about 16, the body portion of the fastener is made from steel having a temperature coefficient of expansion of about 6.2, and the collar is made from INVAR alloy having a coefficient of expansion of about 1.2.

In a manifestation of the invention, the collar includes a body portion and an enlarged flange portion at one end. The flange portion is oriented to lie adjacent the sheet material, for spreading the compressive forces over a larger area than that of the body of the collar.

A method according to a mode of the invention fastens together multiple layers of sheet material having a particular CTE, to form a joined structure for operation over a particular temperature range. The sheets are of various standardized thicknesses. The material of the sheets has a particular temperature coefficient of expansion, and is subject to damage under compressive forces greater than a given level. The method includes the step of juxtaposing the desired number of the layers of sheet material, to thereby form juxtaposed layers having the desired total thickness. The next step is the procuring of an elongated fastener having a body, a head at one end of the body, and a threaded portion at an other end of the body, and a nut. At least the body portion of the elongated fastener has a CTE which is less than the particular CTE. If necessary, an aperture is defined through the juxtaposed layers. The body of the fastener is placed through the aperture, and the nut is threaded onto the threaded end. At a given temperature within the particular temperature range, the nut is tightened, to create a tensile force in the body portion of the fastener which is insufficient to cause the compressive forces of the given level. Between the step of placing the body of the fastener and the step of tightening the nut, one compensation collar is placed between one of (a) the head of the fastener and the juxtaposed layers and (b) the nut and the juxtaposed layers, for each of the layers of material in the juxtaposed layers. Each of the compensation collars has a CTE less than that of the fastener. Each of the compensation collars has an axial dimension which is selected in conjunction with the known thickness of the corresponding one of the sheets of material, the known CTEs of the material and the length of the body of the fastener, to compensate for differences between the CTEs of the thickness of the layer of material and the CTE of the corresponding length of fastener body, in such a manner as to effectively eliminate changes in the tensile force with changes in temperature from the given temperature, at least over the desired range of temperatures.

BRIEF DESCRIPTION OF THE DRAWING

FIG. 1b is similar;

DESCRIPTION OF THE INVENTION

Figure 1A:
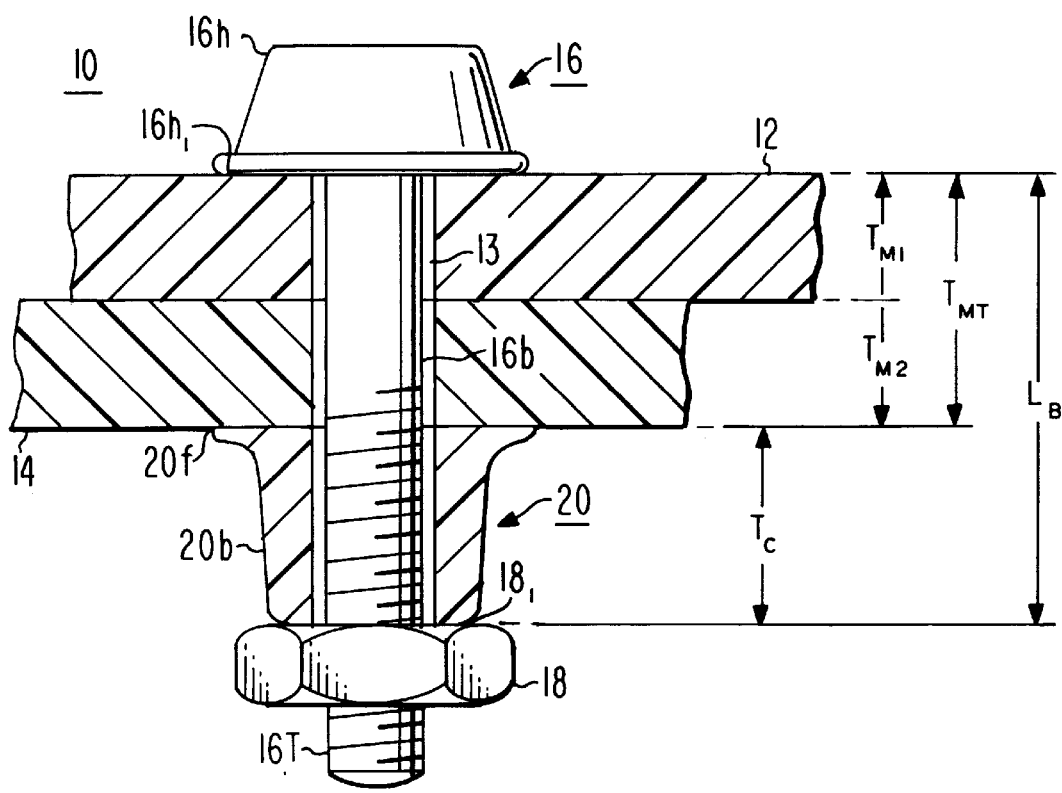
FIG. 1a is a simplified partial cross-section of a joint according to an aspect of the invention.

FIG. 1a illustrates a joint 10, in which a first sheet of composite material 12 is juxtaposed with a second sheet of composite material 14. The thickness of sheet 12 is $T_{M1}$, and the thickness of sheet 14 is $T_{M2}$. The overall thickness of the juxtaposed sheets 12 and 14 is designated as $T_{MT}$. A fastener 16 includes a head 16h, a body 16b, a portion of which is threaded and designated 16T, and a nut 18 with matching threads. As illustrated in FIG. 1a, the body 16b of fastener 16 extends through an aperture 13 extending through both sheets 12 and 14, with its head abutting the upper surface of sheet 12. A collar 20 includes a body portion 20b and a flange portion 20f. The flange portion 20f of collar 20 abuts the lower edge of sheet 14. Nut 18 is tightened against the body portion 20b of collar 20, to thereby apply force which tends to compress the material of sheets 12 and 14 between the head 16h and the flange 20 of collar 20. Those skilled in the art know that composite materials can be crushed when the strain (force times area) exceeds a critical amount. Nut 18 is tightened until the tensile force in body portion 16b of fastener 16 is at a suitable value, which is less than that which crushes the material of sheets 12 andor 14.

It is desirable that the fastener be strong. For this purpose, the fastener 16, 18 of FIG. 1a will often be steel. Steel has a coefficient of thermal expansion or coefficient of temperature expansion (CTE) which is substantially less than that of the composite material. The exact temperature coefficient of the individual sheets 12, 14 of composite material relative to each other is not particularly relevant. Instead, the CTE of the material in total thickness $T_{MT}$, taken as a whole, must be considered. If the materials of the juxtaposed sheets 12 and 14 are the same, then the CTE of the two layers equals that of either sheet alone. If the sheets are of disparate materials, the total CTE will be a weighted average, based on their relative thicknesses.

Figure 1B:
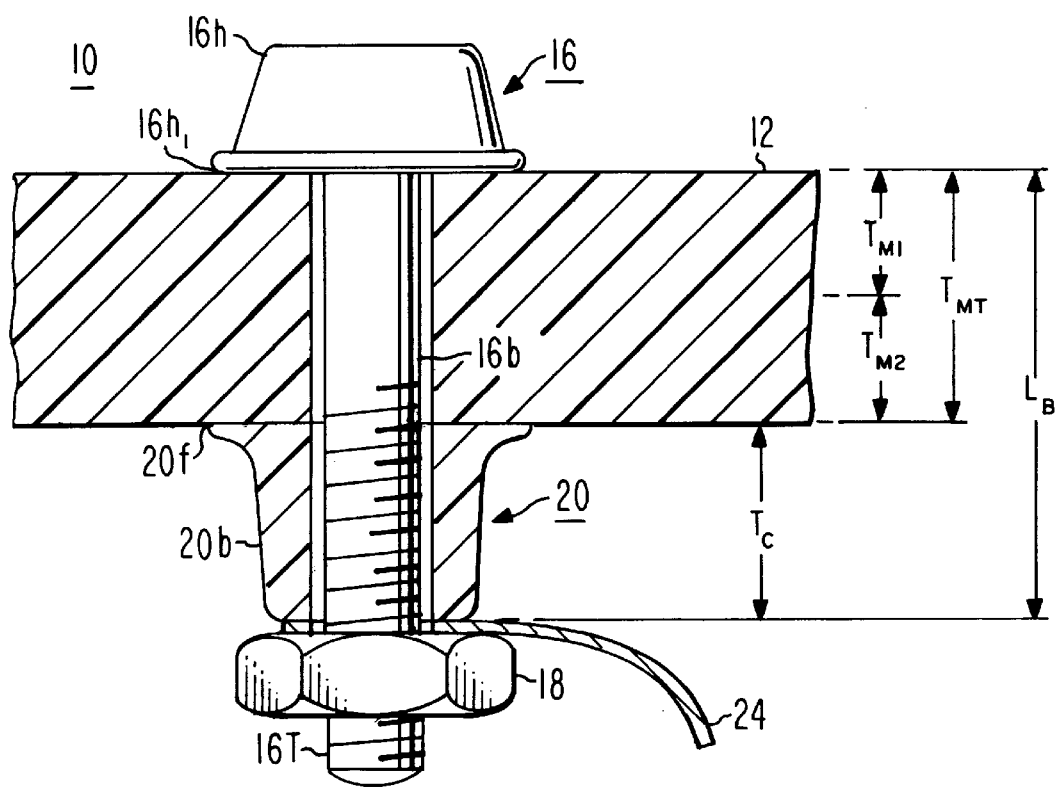

If the joint 10 of FIG. 1a is assembled and tightened at room temperature without the collar 20, the differential expansion of the sheets 12, 14 relative to that portion of the body 16b of fastener 16 lying between the facing sides $16h_1$ and $18_1$ of the head 16h and the nut 18, respectively, the length of which is designated $L_B$ in FIG. 1b, will cause the joint to tighten when the joint temperature increases, and to loosen when the temperature decreases. The joint tightens (the force in body 16b increases) when the joint becomes warmer because the composite material expands at a rate of increase greater than the rate of expansion of the body 16b.

According to an aspect of the invention, the collar 20 is located between the nut and the bottom layer of sheet 14. The material of the nut is selected to have a small, or preferably zero, CTE over the temperature range of interest. One suitable material for use with a steel fastener and carbon-fiber-reinforced polymer is INVAR. The thickness or axial dimension $T_C$ (in a direction parallel to dimension $L_B$ in FIG. 1a) is selected to extend the dimension $L_B$ of the body of the fastener to a value which provides the same amount of expansion as the given thickness of composite material, notwithstanding the lesser CTE of the fastener. This can be readily understood by imagining that the CTE of the fastener 16,18 of FIG. 1a is exactly half the CTE of the composite material 12, 14 lying in thickness $T_{MT}$. The axial dimension $T_C$ of the collar 20 is selected so that the length of the body 16b of the fastener which lies between the facing surfaces $16h_1$ and $18_1$ of the nut 18 and the head 16h, respectively, is exactly twice the thickness $T_{MT}$. Looking at it another way, over any given temperature range, a fastener having twice the length, but half the CTE, of the composite material which it fastens, will have equal absolute value of thermal expansion (or contraction). In general, of course, the CTEs will not be in exact ratios, and the length of fastener between the facing surfaces of the nut and head must be determined analytically.

When a joint 10 having the lengths and CTEs selected as described above is assembled at a temperature within the range, and tightened to a particular value, it will neither tighten nor loosen over the complete temperature range, but rather will maintain the same tension in the body 16b of the fastener.

Figure 1C:
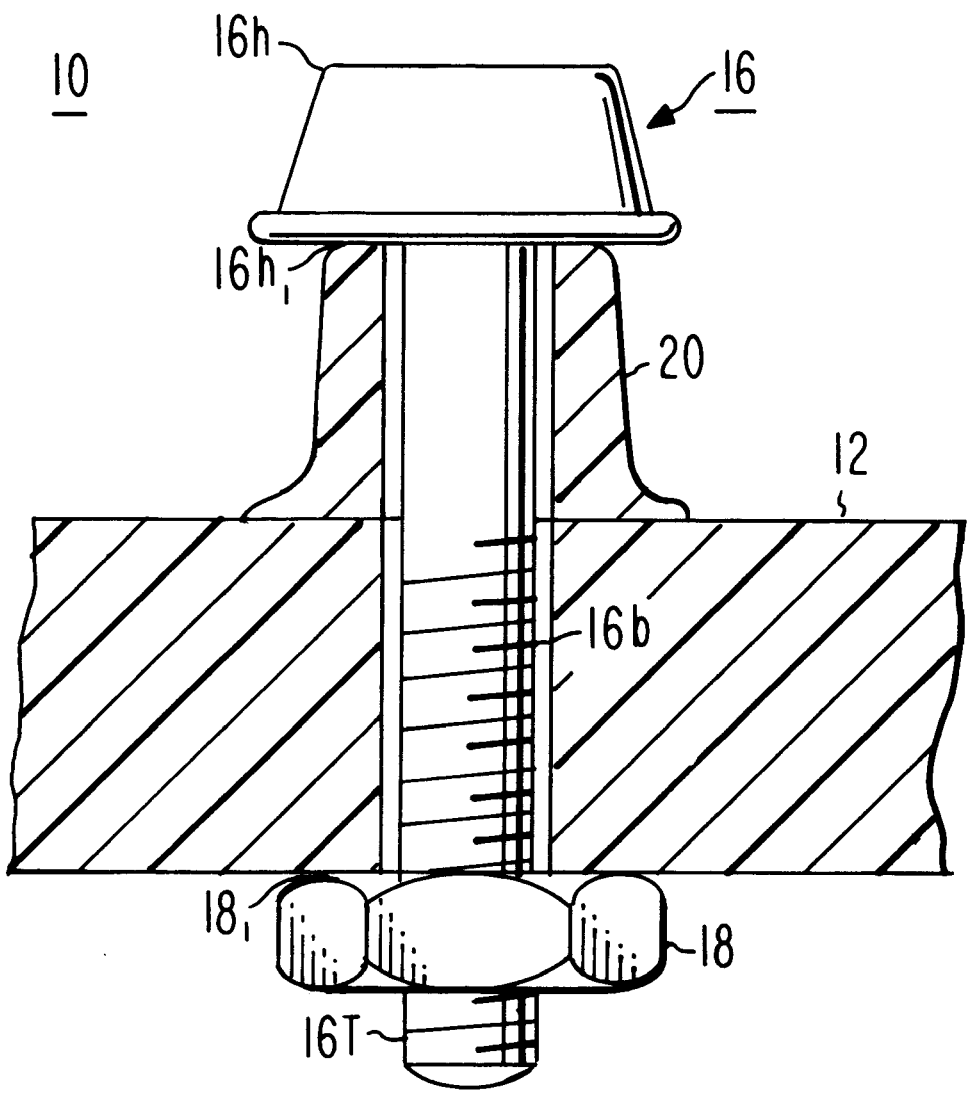

FIG. 1b is similar to FIG. 1a, but has a single sheet 12 of composite material, to which a coupling tab 24 is fastened by fastener 16, 18. FIG. 1c illustrates another version of the invention in which collar 20 is located between the head 16h of fastener 16 and the layer 12 of composite material.

Figure 3:
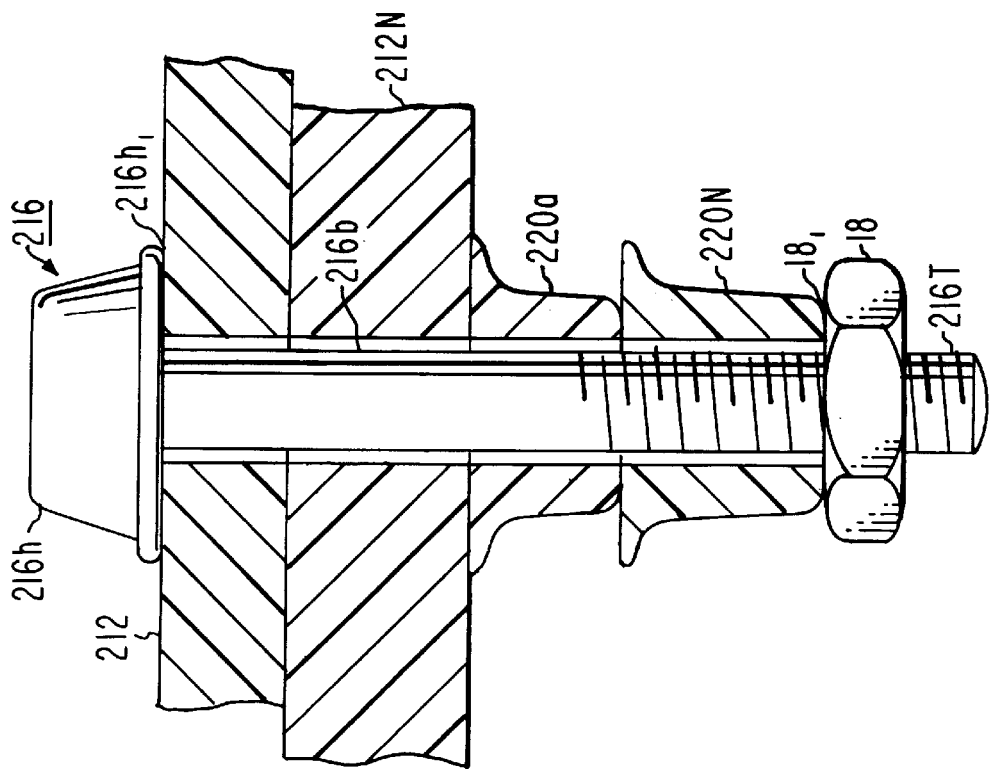
FIG. 3 is a simplified partial cross-section of a joint according to another aspect of the invention, in which multiple sheets of different thicknesses are assembled with different corresponding collars.
Figure 2:
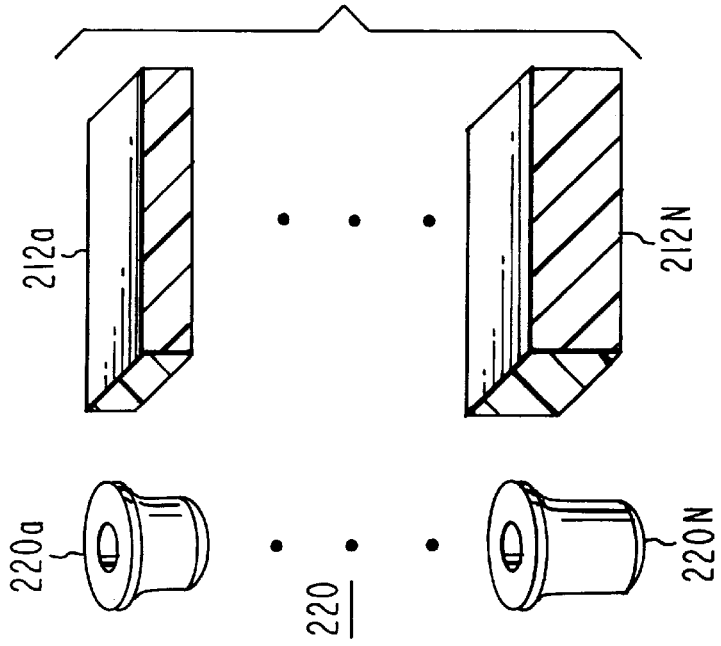
FIG. 2 illustrates a set of different collars, each for use with a sheet of particular material of different thickness and a fastener of particular material.

FIG. 2 is an illustration of a set 220 of low- or zero-CTE collars 220a, . . . , 220N according to a particular hypostasis of the invention. The axial dimensions of collar 220a of set 220 are selected to provide CTE compensation of a sheet 212a of particular composite material of a particular thickness with a steel fastener. Other collars (illustrated by ellipses in FIG. 2) of set 220 are of axial dimensions selected for CTE compensation of other sheets (also illustrated by ellipses) of the same material, but of different standard thickness. The last collar of set 220, namely collar 220N, has its dimensions selected to compensate CTE of the thickest standard sheet 212N for use with a steel fastener. The standard thickness sheets may be, for example, ⅟16". ⅛", ³⁄16". ½", etc. Other thicknesses may be selected as being the standard, and those thicknesses may be expressed in decimal form (½"=0.5") or in metric measurements. By having a set of such collars, each providing compensation for particular thicknesses of a given material with a given other material fastener, joints can be assembled and temperature compensated without extensive calculation or individual fabrication of various collars. When assembling a joint including one thin layer, such as layer 212a of FIG. 2, with one layer of thick material, such as layer 212N, the joint can be assembled with one collar 220a of the set, and one collar 220N, as illustrated in FIG. 3. Naturally, more collars of appropriate thickness would be used when other sheets of material were joined.

Other embodiments of the invention will be apparent to those skilled in the art. For example, the fastener may be of materials other than steel, as for example aluminum, or even a composite material. Load-distributing washers may be used to bear against the composite material rather than flanges. Washers may be captivated. Anti-loosening material may be used in the thread area to prevent the nut from loosening due to vibration, in known manner. Also, the CTE Collars can operate in several modes. In general, the effects they can produce are:

(1) Joint clamp-up force stabilization over temperature changes. In this instance, the goal is to simply avoid having a given clamp-up applied by careful joint assembly from changing when the joint changes temperature.

(2) Controlled joint clamp-up force inverse relationship to temperature. In this mode, the CTE collar is sized so that a decrease in temperature from the assembly temperature will result in an increase in joint clamping force. Likewise, an increase in temperature from assembly temperature will produce a decrease in joint clamping force. This behavior is useful if the component being bolted down has to survive high temperatures where it is susceptible to over-clamp damage, but needs to have high clamping force for joint performance at low temperatures.

(3) Controlled joint clamp-up force proportional relationship to temperature.

In this mode, the CTE collar is sized so that a decrease in temperature from the assembly temperature will result in a decrease in joint clamping force. This behavior is useful if the component being bolted down needs to have higher clamping force at higher temperatures, and may make it easier to disassemble such highly loaded joints at room temperature.

The different modes are produced using CTE collars as set forth below:

Mode (1)—CTE Equalization

Case A (Bolt CTE is lower than clamped material CTE)

The collar for this application is made from a material with a CTE lower than that of the bolt. It is sized so that the net amount of expansion or contraction of the bolt will be equal to the net contraction or expansion of the material in the joint with the CTE collar on top.

Case B (Volt CTE is higher than clamped material CTE)

The collar for this application is made from a material with a CTE higher than that of the bolt. It is sized so that the net amount of expansion or contraction of the bolt will be equal to the net contraction or expansion of the material in the joint with the CTE collar on top.

Case C (Bolt CTE is equal to clamped material CTE)

No collar is needed for this case.

Mode (2)—Inverse clamp-up to Temperature Relation

Case A (Bolt CTE is lower than clamped material CTE)

The collar for this application is made from a material with a CTE higher than that of the bolt. It is sized so that the net amount of expansion or contraction of the bolt will be greater than the net contraction or expansion of the material in the joint with the CTE collar on top. This way, the expansion/contraction of the bolt will lead the expansion/contraction of the stack of material in the joint, and thus cause this behavior.

Case B (Bolt CTE is higher than clamped material CTE)

No collar may be needed for this case. However, the degree of lead present will be tuned by the method in Case A for this mode if the desire is to boost clamping response. If less of a clamping response is desired than is already present, then a CTE collar with a coefficient of thermal expansion greater than that of the bolt will be required. The collar will be sized so that the ratio of expansions between the clamped stack and the bolt produces the desired response.

Case C (Bolt CTE is equal to clamped material CTE)

For this case, the method for producing this effect is the same as in Case A. A collar with a CTE lower than that of the clamped stack-up will result in the inverse clamping behavior. The collar can be sized to produce as strong an effect as needed.

Mode (3)—Direct clamp-up to Temperature Relation

Case A (bolt CTE is lower than clamped material CTE)

No collar may be needed for this case. however, the degree of lead present will be tuned by the method in Case B for this mode if the desire is to boost clamping response. If less of a clamping response is desired than is already present, then a CTE collar with a coefficient of thermal expansion less than that of the bolt will be required. The collar will be sized so that the ratio of expansions between the clamped stack and the bolt produces the desired response.

Case B (Bolt CTE is higher than clamped material CTE)

The collar for this application is made from a material with a CTE higher than that of the bolt. It is sized so that the net amount of expansion or contraction of the bolt will be less than the net contraction or expansion of the material in the joint with the CTE collar on top. This way, the expansion/contraction of the bolt will trail the expansion/contraction of the stack of material in the joint, and thus cause this behavior.

Case C (bolt CTE is equal to clamped material CTE)

For this case, the method for producing this effect is the same as in Case B. A collar with a CTE higher than that of the clamped stack-up will result in the inverse clamping behavior. The collar can be sized to produce as strong an effect as needed.

Thus, according to an aspect of the invention, a joint (10) subject to temperature variation includes a sheet of material (12, 14) defining a through aperture (13) for an elongated fastener (16, 18). The material of the sheet (12, 14) has a particular temperature coefficient of expansion, and is subject to damage under compressive forces greater than a given level. An elongated fastener (16, 18) includes a body portion (16*b*), part of which extends through the aperture (13). The fastener (16, 18) also includes a head (16*h*) at one end and an other threaded end (16T), and has a temperature coefficient of expansion less than the particular temperature coefficient of expansion of the material. The fastener (16, 18) further includes a nut (18) threaded onto the threaded end (16T). When the nut (18) is tightened at an assembly temperature within the range of variation, it compresses that portion of the sheet (12, 14) of material lying in the region between the head (16*h*) and the nut (18) to a value of compressive force less than the given level. Under these conditions, temperatures different from the assembly temperature may cause the material of the sheet (12, 14) to expand or contract at a rate greater than the corresponding expansion or contraction rate of the fastener (16, 18) so as to result in compression exceeding the given level. A collar (20; 220*a*, 220*b*) surrounds a portion of the body (16*b*) of the fastener (16, 18), and is located either (one of) between (a) the nut (18) and the sheet (12, 14) of material, or (and) (b) the head (16*h*) and the material. The collar (20; 220*a*, 220*b*) has a temperature coefficient of expansion which is less than that of the fastener (16, 18), and has a length, which is in the direction of the axis of elongation of the body of the fastener, selected so that the difference between a first product and a second product is grater than or equal to the product of the particular coefficient of expansion of the material multiplied by the thickness of the material. In this selection, the first product is the product of the coefficient of expansion of the fastener (16, 18) multiplied by the length of that portion of the body (16*b*) of the fastener (16, 18) lying between facing sides of the head (16*h*) and the nut (18). In this selection, the second product is the product of the coefficient of expansion of the collar (20; 220a, 220b), multiplied by the length of the collar (20; 220a, 220b).

In a particular avatar of the invention, the material of the sheet (12, 14) is carbon fiber reinforced laminate having a temperature coefficient of expansion of about 16, the body portion (16b) of the fastener (16, 18) is made from steel having a temperature coefficient of expansion of about 6.2, and the collar (20; 220a, 220b) is made from INVAR alloy having a coefficient of expansion of about 1.2.

In a manifestation of the invention, the collar (20; 220a, 220b) includes a body portion and an enlarged flange portion (20f) at one end. The flange portion (20f) is oriented to lie adjacent the sheet material, for spreading the compressive forces over a larger area than that of the body of the collar (20; 220a, 220b).

A method according to a mode of the invention fastens together multiple layers of sheet (12, 14) material having a particular CTE, to form a joined structure for operation over a particular temperature range. The sheets are of various standardized thicknesses. The material of the sheets (12, 14) has a particular temperature coefficient of expansion, and is subject to damage under compressive forces greater than a given level. The method includes the step of juxtaposing the desired number of the layers of sheet material, to thereby form juxtaposed layers having the desired total thickness. The next step is the procuring of an elongated fastener (16, 18) having a body, a head (16h) at one end of the body, and a threaded portion at an other end of the body, and a nut. At least the body portion (16b) of the elongated fastener (16, 18) has a CTE which is less than the particular CTE. If necessary, an aperture (13) is defined through the juxtaposed layers. The body of the fastener (16, 18) is placed through the aperture (13), and the nut (18) is threaded onto the threaded end. At a given temperature within the particular temperature range, the nut (18) is tightened, to create a tensile force in the body portion (16b) of the fastener (16, 18) which is insufficient to cause the compressive forces of the given level. Between the step of placing the body of the fastener (16, 18) and the step of tightening the nut (18), one compensation collar (20; 220a, 220b) is placed between one of (a) the head (16h) of the fastener (16, 18) and the juxtaposed layers and (b) the nut (18) and the juxtaposed layers, for each of the layers of material in the juxtaposed layers. Each of the compensation collars (20; 220a, :220b) has a CTE less than that of the fastener (16, 18). Each of the compensation collars (20; 220a, 220b) has an axial dimension which is selected in conjunction with the known thickness of the corresponding one of the sheets (12, 14) of material, the known CTEs of the material and the length of the body of the fastener (16, 18), to compensate for differences between the CTEs of the thickness of the layer of material and the CTE of the corresponding length of fastener (16, 18) body, in such a manner as to effectively eliminate changes in the tensile force with changes in temperature from the given temperature, at least over the desired range of temperatures.

What is claimed is:

1. A joint subject to a range of temperature variation, comprising:
    a material defining a through aperture, said material having a particular temperature coefficient of expansion, and being subject to damage under compressive forces greater than a given level;
    an elongated fastener including a body portion, part of which extends through said aperture, said fastener also including a head at one end and an other threaded end, and having a temperature coefficient of expansion less than said particular temperature coefficient of expansion of said material, said fastener further including a nut threaded onto said threaded end, for, at an assembly temperature within said range of variation, compressing that portion of said material lying in the region between said head and said nut to a value of said compressive force less than said given level, whereby temperatures different from said assembly temperature may cause said material to expand or contract at a rate greater than the corresponding expansion or contraction rate of said fastener so as to result in compression exceeding said given level;
    a collar surrounding a portion of said body portion of said fastener, and located between one of (a) said nut and said material and (b) said head and said material, said collar having a temperature coefficient of expansion which is less than that of said fastener, and a length selected so that the difference between a first product and a second product is greater than or equal to the product of said particular coefficient of expansion of said material multiplied by the thickness of said material, where said first product is the product of the coefficient of expansion of said fastener multiplied by the length of said body of said fastener between facing sides of said head and said nut, and said second product is the product of said coefficient of expansion of said collar, multiplied by the length of said collar.

2. A joint according to claim 1, wherein said material is carbon fiber reinforced laminate having a temperature coefficient of expansion of about 16, said body portion of said fastener is made from steel having a temperature coefficient of expansion of about 6.2, and said collar is made from INVAR alloy having a coefficient of expansion of about 1.2.

3. A joint according to claim 1, wherein said collar includes a body portion and an enlarged flange portion at one end thereof, said flange portion lying adjacent said material, for spreading said compressive forces over a larger area than that of said body portion of said collar.

4. A method for fastening together multiple layers of sheet material having a particular coefficient of thermal expansion (CTE) to form a joined structure for operation over a particular temperature range, the material of said multiple layers of sheet material having a particular coefficient of thermal expansion, and being subject to damage under compressive forces greater than a given level, said sheet material being of various standard thicknesses, said method comprising the steps of
    juxtaposing the desired number of said layers of sheet material to thereby form juxtaposed layers;
    procuring an elongated fastener having a body, a head at one end of said body, and a threaded portion at an other end of said body, said elongated fastener having a coefficient of thermal expansion which is less than said particular coefficient of thermal expansion;
    if necessary, defining an aperture through said juxtaposed layers;
    placing the body of said fastener through said aperture, and threading a nut onto said threaded other end;
    at a given temperature within a particular temperature range, tightening said nut, to create a tensile force in said body of said fastener which is insufficient to cause said compressive forces of said given level at any temperature within said temperature range;
    between said step of placing the body of said fastener and said step of tightening said nut, placing, between one of (a) said head of said fastener and said juxtaposed layers and (b) said nut and said juxtaposed layers, one compensation collar for each of said layers, each of said compensation collars having a coefficient of thermal expansion less than that of said fastener, each of said compensation collars having an axial dimension which is selected in conjunction with the known thickness of the corresponding one of said sheet material and the known coefficients of thermal expansion of said material and said body of said fastener, to compensate for differences between said coefficient of thermal expansion of said thickness of said layer of material and the coefficient of thermal expansion of the corresponding length of said fastener body, in such a manner as to effectively eliminate changes in said tensile force with increases in temperature from said given temperature.

* * * * *